2,925,354

COATED POLYETHYLENE AND PROCESS OF MAKING SAME

Frank M. Berardinelli, South Orange, and John S. Shanly, New Providence, N.J., assignors to Celanese Corporation of America, New York, N.Y., a corporation of Delaware No Drawing. Application February 23, 1954
Serial No. 412,066

7 Claims. (Cl. 117—12)

This invention relates to coated polyethylene materials and relates more particularly to coated polyethylene materials to which printing inks show a good adhesion.

Polyethylene materials such as films and the like have come into widespread use, particularly in the packaging industry where they are widely employed for the packaging of many diversified products. It would be desirable, when the polyethylene films are employed in this manner, to be able to print onto the polyethylene films so that the packages wrapped therewith would have an attractive appearance to the consumer. However, conventional printing inks do not adhere strongly to the polyethylene films and are not satisfactory for this purpose. There have been compounded special inks that adhere strongly to the surface of polyethylene films. However, not only did these special inks fail to meet with the approval of the polyethylene film printer, who preferred to employ conventional inks, but they also required certain aftertreatments which could not be carried out on the printing machinery normally used.

It is an important object of this invention to provide coated polyethylene materials which will be free from the foregoing and other difficulties.

A further object of this invention is to provide coated polyethylene materials to which printing inks will show a good adhesion.

Other objects of this invention will be apparent from the following detailed description and claims.

According to the present invention, polyethylene materials such as films and the like are coated either completely or in selected areas with a composition comprising a mixture of chlorosulfonated polyethylene and cyclized rubber and are then heated to an elevated temperature for a short period of time. Conventional printing inks show a good adhesion to surfaces thus coated when applied by normal printing techniques. In addition, the coating is non-sticky and free from haze. The field of usefulness of the coated polyethylene material is thereby considerably increased.

In making up the coating composition of this invention, there is employed a mixture of chlorosulfonated polyethylene and cyclized rubber containing between about 20 and 80% by weight of the chlorosulfonated polyethylene. There may also be present in the said composition additional materials such as, for example, waxes, including true waxes as well as paraffin wax in amounts ranging up to about 25% by weight on the same basis. The inclusion of waxes and chlorinated waxes in the coating composition is especially desirable when the proportion of chlorosulfonated polyethylene exceeds about 40–50% by weight of the coating composition in that it eliminates the tendency of such coating compositions to exhibit a slight tackiness. There may also be present in the coating composition other materials such as antioxidants, for example, p-benzyl aminophenol, N:N:N':N'-tetramethyl-4:4′ diamino diphenyl methane, 4:4′ diamino diphenyl methane, 2:4-diamino-diphenylamine and tetramethyl diamino benzhydrol in amounts ranging between about 0.5 and 2% by weight based on the weight of the cyclized rubber to prevent deterioration of the rubber with age. The coating composition may also contain up to about 8% by weight on the weight of the chlorosulfonated polyethylene of an accelerator to increase the rate of cure of said material during heating. Suitable accelerators for this purpose include, for example, the condensation product of butyraldehyde and aniline known as Accelerator 808, dipentamethylenethiuram tetrasulfide, and 2-mercaptobenzthiazole.

The coating composition may be applied to the polyethylene from solution in toluene, benzene, xylene or other aromatic solvents which will dissolve the ingredients thereof, but which will not affect the polyethylene itself in an adverse manner. The concentration of the chlorosulfonated polyethylene in the solution may range between about 0.5 and 2.0% by weight and the concentration of the cyclized rubber in the solution may range between about 0.5 and 2.0% by weight. In applying the coating composition good results have been obtained when the rate of application is adjusted so as to deposit between about 0.25 and 2 pounds of solids from the coating composition per ream (3000 square feet) of surface treated.

Following the application of the coating composition the coated polyethylene material is heated to a temperature of between about 80 and 90° C. for a period of between about 2 and 5 minutes. During this heating period, the coating composition changes in character and develops a surface to which inks will adhere strongly. The heating may be carried out in any desired manner as through the use of hot air, a heated roll or other surface, radiant heating units and the like. Following the heating period, the polyethylene material may be printed or it may be stored and may be printed at a later time in conventional printing equipment. The coating and heating of the polyethylene material may be carried out concurrently with the production thereof, if desired.

The invention will now be described in connection with the treatment of polyethylene films. It should be understood that it may be applied to other articles having a surface of polyethylene to which it is desired to apply printing such as, for example, blown, molded or polyethylene coated articles.

The following examples are given to illustrate this invention further.

*Example I*

A polyethylene film is coated with a solution containing 1.0 part by weight of chlorosulfonated polyethylene (Hypalon S–2), 0.5 part by weight of cyclized rubber (Pliolite 50), and 0.04 part of paraffin wax (melting point 151° F.), all dissolved in 98.46 parts by weight of toluene at a rate to leave a deposit of 1 pound of solids per ream of surface treated. The coated film is then treated for 5 minutes with air heated to 90° C. and permitted to cool. The coating is clear and non-tacky.

The coated polyethylene film is printed with a conventional printing ink which shows an excellent adherence thereto as evidenced by a test involving applying a pressure-sensitive tape to the printed area of the polyethylene film and stripping the tape from the printed film.

*Example II*

A polyethylene film is coated with a solution containing 1.0 part by weight of chlorosulfonated polyethylene (Hypalon S–2) and 1.0 part by weight of cyclized rubber (Pliolite 50) dissolved in 98 parts by weight of toluene to leave a deposit of 0.5 pound per ream of solids on the treated surface. The coated film is then treated with air heated to 90° C. and permitted to cool. The coating is clear and slightly tacky, though not so tacky as to be commercially objectionable for most applications.

The coated polyethylene film is printed with a conventional printing ink which shows an excellent adherence thereto as evidenced by a test applied in the manner described in Example I.

*Example III*

A polyethylene film is coated with a solution containing 0.67 part by weight of chlorosulfonated polyethylene (Hypalon S-2), 0.67 part by weight of cyclized rubber (Pliolite 50) and 0.67 part by weight of chlorinated paraffin wax (melting point 95–110° C.) (Chlorowax 70), dissolved in 98 parts by weight of toluene at a rate to leave a deposit of 1 pound of solids per ream of surface treated. The coated film is then treated for 5 minutes with air heated to 90° C. and permitted to cool. The coating is clear and non-tacky.

The coated polyethylene film is printed with a conventional printing ink which shows excellent adherence thereto as evidenced by a test applied in the manner described in Example I.

It is to be understood that the foregoing detailed description is given merely by way of illustration and that many variations may be made therein without departing from the spirit of our invention.

Having described our invention, what we desire to secure by Letters Patent is:

1. A polyethylene surface, having thereon a substantially clear, non-tacky adherent coating comprising a mixture of chlorosulfonated polyethylene and cyclized rubber, said mixture containing between about 20 and 80% by weight of the chlorosulfonated polyethylene, said coating being receptive to conventional printing inks applied by normal printing techniques.

2. A polyethylene surface, having thereon a substantially clear, non-tacky adherent coating comprising a mixture of chlorosulfonated polyethylene and cyclized rubber, said mixture containing between about 20 and 80% by weight of the chlorosulfonated polyethylene and a member of the class consisting of waxes and chlorinated waxes, said coating being receptive to conventional printing inks applied by normal printing techniques.

3. A polyethylene surface, having thereon a substantially clear, non-tacky adherent coating comprising a mixture of chlorosulfonated polyethylene and cyclized rubber, said mixture containing between about 20% and 80% by weight of the chlorosulfonated polyethylene, and printing ink on said coating.

4. A process for forming a substantially clear, non-tacky coating receptive to printing ink on a polyethylene surface, which comprises coating a polyethylene surface with a clear mixture of chlorosulfonated polyethylene and cyclized rubber, said mixture containing between about 20% and 80% by weight of the chlorosulfonated polyethylene, and heating said coating to an elevated temperature for a period of time sufficient to develop therein a receptivity to conventional printing inks applied by normal printing techniques.

5. A process for forming a substantially clear, non-tacky coating receptive to printing ink on a polyethylene surface, which comprises coating a polyethylene surface with a clear mixture of chlorosulfonated polyethylene and cyclized rubber, said mixture containing between about 20% and 80% by weight of the chlorosulfonated polyethylene, and heating said coating to a temperature of between about 80 and 90° C. for a period of between about 2 and 5 minutes.

6. A process for forming a substantially clear, non-tacky coating receptive to printing ink on a polyethylene surface, which comprises coating a polyethylene surface with a clear mixture of chlorosulfonated polyethylene and cyclized rubber, said mixture containing between about 20% and 80% by weight of the chlorosulfonated polyethylene, heating said coating to a temperature of between about 80 and 90° C. for a period of between about 2 and 5 minutes, and applying a conventional printing ink to said coating by normal printing techniques.

7. A process for forming on a polyethylene surface a substantially clear, non-tacky adherent coating receptive to conventional printing inks applied by normal printing techniques, which comprises coating a polyethylene surface with a clear mixture of chlorosulfonated polyethylene and cyclized rubber, said mixture containing between about 20 to 80% by weight of the chlorosulfonated polyethylene, heating said coating to a temperature of between about 80 and 90° C. for a period of between about 2 and 5 minutes, and applying printing ink to said coating.

References Cited in the file of this patent

UNITED STATES PATENTS

| | | |
|---|---|---|
| 2,340,452 | Child et al. | Feb. 1, 1944 |
| 2,507,699 | Edgar et al. | May 16, 1950 |
| 2,612,480 | May | Sept. 30, 1952 |
| 2,639,998 | Pavlic | May 26, 1953 |
| 2,729,608 | Strain | Jan. 3, 1956 |

OTHER REFERENCES

Davis et al.: "The Chemistry and Technology of Rubber," 1937, pp. 656–660.

Warner: "Hypalon S-2, A New Elastomer," Rubber Age, vol. 71, pp. 205–221.

Dupont Information Bulletin "Hypalon" S-2 Chlorosulfonated Polythene No. X-35, (rec'd Aug. 8, 1952).